United States Patent
Tsukamoto et al.

(10) Patent No.: US 9,879,585 B2
(45) Date of Patent: Jan. 30, 2018

(54) EXHAUST PURIFICATION DEVICE FOR INTERNAL COMBUSTION ENGINE

(71) Applicant: TOYOTA JIDOSHA KABUSHIKI KAISHA, Toyota-shi, Aichi-ken (JP)

(72) Inventors: Yoshihisa Tsukamoto, Susono (JP); Kazuhiro Itoh, Mishima (JP); Hiromasa Nishioka, Susono (JP); Daichi Imai, Suntou-gun (JP); Hiroshi Otsuki, Gotenba (JP); Yasumasa Notake, Susono (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 0 days.

(21) Appl. No.: 15/031,032

(22) PCT Filed: Aug. 26, 2014

(86) PCT No.: PCT/JP2014/072862
§ 371 (c)(1),
(2) Date: Apr. 21, 2016

(87) PCT Pub. No.: WO2015/060015
PCT Pub. Date: Apr. 30, 2015

(65) Prior Publication Data
US 2016/0265411 A1    Sep. 15, 2016

(30) Foreign Application Priority Data
Oct. 22, 2013    (JP) .................................. 2013-219495

(51) Int. Cl.
*F01N 3/00*    (2006.01)
*F01N 9/00*    (2006.01)
(Continued)

(52) U.S. Cl.
CPC .......... *F01N 9/002* (2013.01); *B01D 46/2429* (2013.01); *F01N 3/0222* (2013.01);
(Continued)

(58) Field of Classification Search
USPC .......... 60/286, 289, 290, 291, 292, 293, 295, 60/297, 311
See application file for complete search history.

(56) References Cited

U.S. PATENT DOCUMENTS 7,980,060 B2 * 7/2011 Tachimoto ............. F01N 9/002
60/277
8,713,922 B2 * 5/2014 Yano ................... B01D 53/9418
60/301
(Continued)

FOREIGN PATENT DOCUMENTS

CN    1639447 A    7/2005
CN    102191981 A    9/2011
(Continued)

*Primary Examiner* — Binh Q Tran
(74) *Attorney, Agent, or Firm* — Finnegan, Henderson, Farabow, Garrett & Dunner, LLP

(57) ABSTRACT

Micropore zones ZMI are defined at upstream sides of partition walls 72 of a particulate filter and macropore zones ZMA are defined at downstream sides of partition walls. The pore size of the partition walls at the micropore zones is set so that the particulate matter and the ash can be trapped by the partition walls at the micropore zones, while the pore size of the partition walls at the macropore zones is set so that the ash can pass through the partition walls at the macropore zones. When a quantity of trapped particulate matter is smaller than a limit quantity, control for increasing gas which temporarily increases the flow rate of the gas which flows into the particulate filter in order to remove the ash from the particulate filter, is performed.

8 Claims, 19 Drawing Sheets

(51) Int. Cl.
  *F01N 3/05* (2006.01)
  *F01N 3/22* (2006.01)
  *F01N 3/32* (2006.01)
  *F01N 3/022* (2006.01)
  *F01N 3/023* (2006.01)
  *F01N 3/029* (2006.01)
  *B01D 46/24* (2006.01)
  *F02D 41/02* (2006.01)
  *F02D 41/14* (2006.01)

(52) U.S. Cl.
  CPC ......... *F01N 3/0232* (2013.01); *F01N 3/0238* (2013.01); *F01N 3/0293* (2013.01); *F01N 3/05* (2013.01); *F01N 3/22* (2013.01); *F01N 3/32* (2013.01); *F02D 41/029* (2013.01); *B01D 2046/2437* (2013.01); *F01N 2330/06* (2013.01); *F01N 2330/30* (2013.01); *F01N 2330/60* (2013.01); *F01N 2510/068* (2013.01); *F01N 2900/0412* (2013.01); *F01N 2900/1406* (2013.01); *F01N 2900/1606* (2013.01); *F01N 2900/1611* (2013.01); *F02D 41/1445* (2013.01); *F02D 2200/0812* (2013.01); *Y02T 10/47* (2013.01)

(56) References Cited

U.S. PATENT DOCUMENTS

| | | | |
|---|---|---|---|
| 9,273,574 B2* | 3/2016 | Tanaka | F01N 3/0222 |
| 2005/0160710 A1 | 7/2005 | Taoka et al. | |
| 2006/0048507 A1* | 3/2006 | Tochikawa | F01N 3/023 |
| | | | 60/295 |
| 2006/0179825 A1* | 8/2006 | Hu | B01D 46/0036 |
| | | | 60/297 |
| 2006/0245985 A1* | 11/2006 | Harada | B01D 53/944 |
| | | | 422/177 |
| 2010/0124519 A1 | 5/2010 | Kohli | |
| 2010/0184589 A1 | 7/2010 | Miyairi et al. | |
| 2011/0219752 A1 | 9/2011 | Gonze et al. | |
| 2015/0322832 A1* | 11/2015 | Itoh | B01J 35/04 |
| | | | 55/495 |

FOREIGN PATENT DOCUMENTS

| | | |
|---|---|---|
| EP | 2 103 342 A1 | 9/2009 |
| EP | 2 502 660 A1 | 9/2012 |
| JP | 11-324647 | 11/1999 |
| JP | 2004-239199 A | 8/2004 |
| JP | 2010-167366 | 8/2010 |
| WO | WO 2010/112781 A1 | 10/2010 |

* cited by examiner

EXHAUST PURIFICATION DEVICE FOR INTERNAL COMBUSTION ENGINE

CROSS-REFERENCE TO RELATED APPLICATIONS

This application is a national phase application of International Application No. PCT/JP2014/072862, filed Aug. 26, 2014, and claims the priority of Japanese Application No. 2013-219495, filed Oct. 22, 2013, the content of both of which is incorporated herein by reference.

TECHNICAL FIELD

The present invention relates to an exhaust purification device for an internal combustion engine.

BACKGROUND ART

Known in the art is an internal combustion engine which arranges a particulate filter for trapping particulate matter which is contained in exhaust gas in an exhaust passage. As a result, the quantity of particulate matter which is discharged into the atmosphere is suppressed. In this regard, if the quantity of particulate matter on the particulate filter becomes greater, the pressure loss of the particulate filter will gradually become greater. As a result, the engine output is liable to drop. Therefore, known in the art is an internal combustion engine which performs control for removing PM which removes particulate matter from the particulate filter. If doing this, an increase in the pressure loss of the particulate filter due to the particulate matter is suppressed.

In this regard, exhaust gas contains noncombustible ingredients called "ash". This ash is trapped together with the particulate matter at the particulate filter. In this regard, even if control for removing PM is performed, the ash will not burn or vaporize, but will remain on the particulate filter. For this reason, as the engine operating time becomes longer, the quantity of the ash which is trapped on the particulate filter will gradually increase and the pressure loss of the particulate filter will gradually become larger. As a result, even if control for removing PM is repeatedly performed, the engine output is liable to drop.

Therefore, known in the art is an internal combustion engine which causes the exhaust to pulsate to generate a flow of exhaust gas which flows in reverse inside the particulate filter and thereby makes the ash separate from the particulate filter (see PLT 1).

CITATIONS LIST

Patent Literature

PLT 1: Japanese Patent Publication No. 11-324647A

SUMMARY OF INVENTION

Technical Problem

However, in PLT 1, the ash which is separated from the particulate filter due to pulsation of the exhaust is only returned to the inside of the exhaust passage upstream of the particulate filter. For this reason, the ash is again trapped on the particulate filter. Therefore, in PLT 1, it is not possible to suppress the increase in the pressure loss of the particulate filter due to ash.

Solution to Problem

According to the present invention, there is provided an exhaust purification device for an internal combustion engine which arranges a particulate filter for trapping particulate matter which is contained in exhaust gas in an engine exhaust passage, where the particulate filter is provided with alternately arranged exhaust gas inflow passages and exhaust gas outflow passages and porous partition walls which separate these exhaust gas inflow passages and exhaust gas outflow passages from each other, micropore zones are defined at upstream sides of the partition walls, macropore zones are defined at downstream sides of the partition walls, a pore size of the partition walls in the micropore zones is set so that particulate matter and ash can be trapped by the partition walls at the micropore zones, and a pore size of the partition walls in the macropore zones is set so that ash can pass through the partition walls at the macropore zones, characterized in that when a quantity of trapped particulate matter on the particulate filter is smaller than a predetermined limit quantity, control for increasing gas which temporarily increases the flow rate of gas which flows into the particulate filter in order to remove the ash from the particulate filter, is performed.

Advantageous Effects of Invention

It is possible to suppress an increase in pressure loss of a particulate filter due to ash.

DESCRIPTION OF EMBODIMENTS

Figure 1:
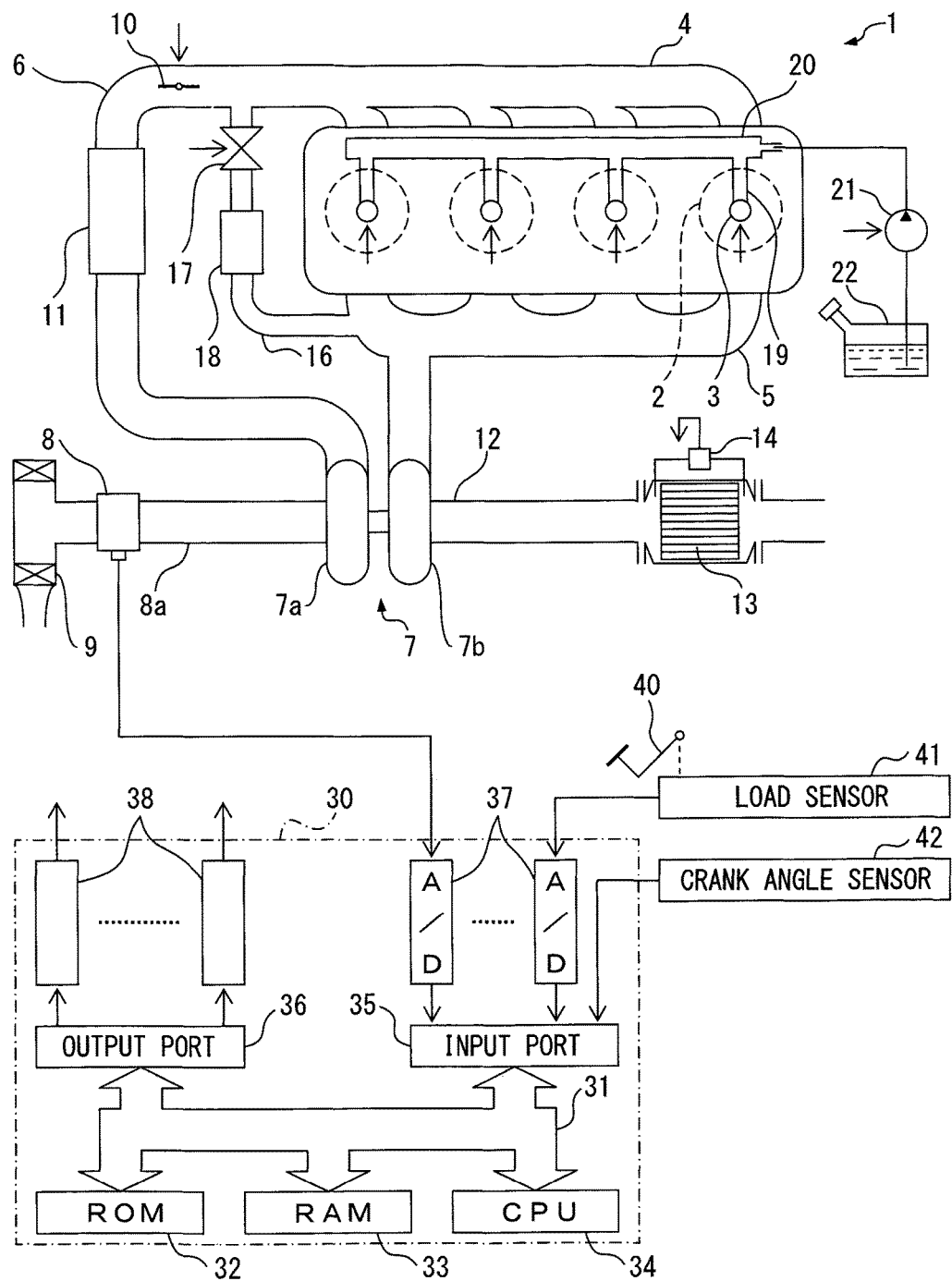
FIG. 1 is an overall view of an internal combustion engine of an embodiment according to the present invention.

Referring to FIG. 1, 1 indicates a body of a compression ignition type internal combustion engine, 2 indicates a combustion chamber of a cylinder, 3 indicates an electronic control type fuel injector for injecting fuel into a combustion chamber 2, 4 indicates an intake manifold, and 5 indicates an exhaust manifold. The intake manifold 4 is connected through an intake duct 6 to an outlet of a compressor 7a of an exhaust turbocharger 7, while an inlet of the compressor 7a is connected through an intake introduction pipe 8a in which an air flowmeter 8 is arranged to an air cleaner 9. Inside the intake duct 6, an electrical control type throttle valve 10 is arranged. Further, around the intake duct 6, a cooling device 11 is arranged for cooling the intake air which flows through the inside of the intake duct 6.

On the other hand, the exhaust manifold 5 is connected to the inlet of the exhaust turbine 7b of the exhaust turbocharger 7, while the outlet of the exhaust turbine 7b is connected through the exhaust pipe 12 to the particulate filter 13.

The exhaust manifold 5 and the intake manifold 4 are connected to each other through an exhaust gas recirculation (hereinafter referred to as "EGR") passage 16. Inside the EGR passage 16, an electrical control type EGR control valve 17 is arranged. Further, around the EGR passage 16, a cooling device 18 is arranged for cooling the EGR gas which flows through the inside of the EGR passage 16. On the other hand, each fuel injector 3 is connected through a fuel runner 19 to a common rail 20. This common rail 20 is connected through an electrical control type variable discharge fuel pump 21 to a fuel tank 22. The fuel which is stored in the fuel tank 22 is supplied by the fuel pump 21 to the inside of the common rail 20. The fuel which is supplied to the common rail 20 is supplied through the fuel runners 19 to the fuel injectors 3. Note that, in another embodiment which is not shown, the internal combustion engine 1 is comprised of a spark ignition type internal combustion engine.

The electronic control unit 30 is comprised of a digital computer which is provided with components which are connected together by a bidirectional bus 31 such as a ROM (read only memory) 32, RAM (random access memory) 33, CPU (microprocessor) 34, input port 35, and output port 36. At the particulate filter 13, a differential pressure sensor 14 is attached for detecting the pressure difference before and after the particulate filter 13. The output signals of the air flowmeter 8 and differential pressure sensor 14 are input through corresponding AD converters 37 to the input port 35. Further, an accelerator pedal 40 is connected to a load sensor 41 which generates an output voltage which is proportional to the amount of depression L of the accelerator pedal 40. The output voltage of the load sensor 41 is input through a corresponding AD converter 37 to the input port 35. Furthermore, the input port 35 is connected to a crank angle sensor 42 which generates an output pulse every time a crankshaft rotates by, for example, 15°. The CPU 34 uses the output pulses from the crank angle sensor 42 as the basis to calculate the engine speed Ne. On the other hand, the output port 36 is connected through corresponding drive circuits 38 to the fuel injectors 3, drive actuator of the throttle valve 10, EGR control valve 17, and fuel pump 21.

Figure 2A:
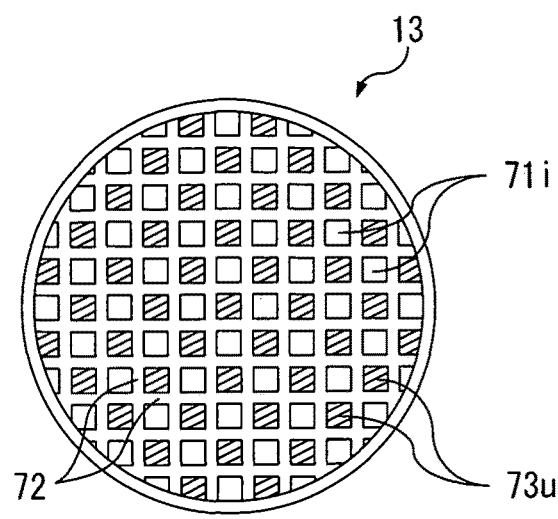
FIG. 2A is a front view of a particulate filter.
Figure 2B:
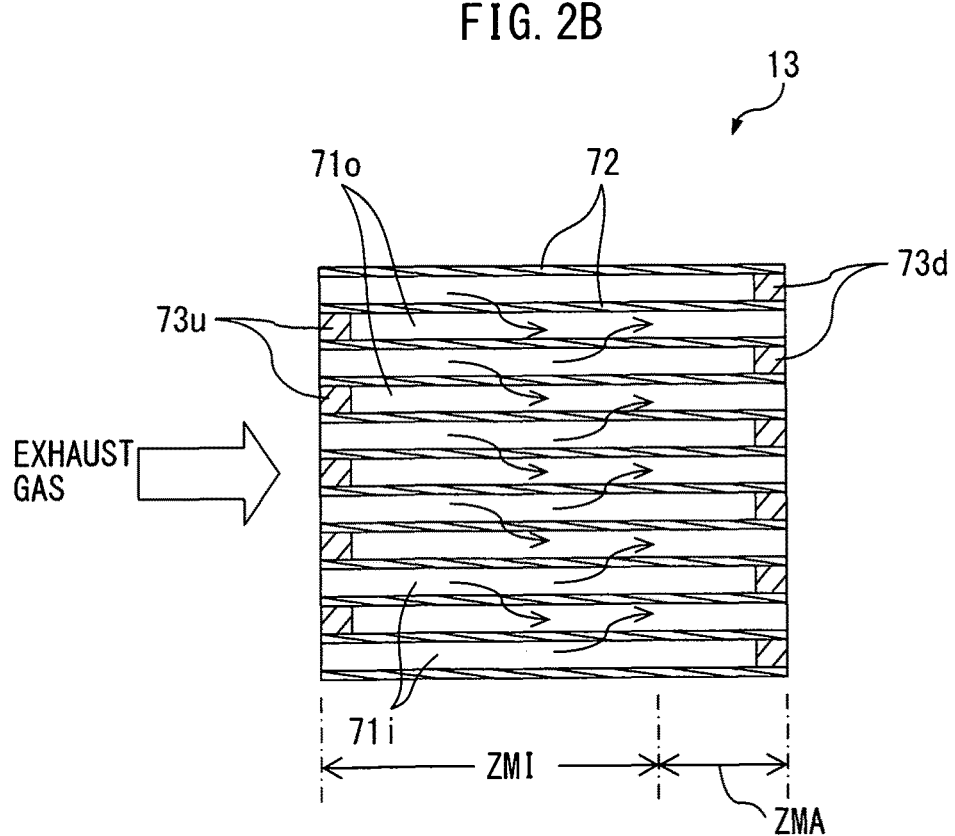
FIG. 2B is a side cross-sectional view of a particulate filter.

FIG. 2A and FIG. 2B shows the structure of the wall flow type particulate filter 13. Note that, FIG. 2A shows a front view of the particulate filter 13, while FIG. 2B shows a side cross-sectional view of the particulate filter 13. As shown in FIG. 2A and FIG. 2B, the particulate filter 13 forms a honeycomb structure which is provided with a plurality of exhaust flow passages 71i and 71o which extend in parallel with each other and partition walls 72 which separate these exhaust flow passages 71i and 71o from each other. In the embodiment which is shown in FIG. 2A, the exhaust flow passages 71i and 71o are comprised of exhaust gas inflow passages 71i with upstream ends which are open and with downstream ends which are closed by stoppers 73d and exhaust gas outflow passages 71o with upstream ends which are closed by stoppers 73u and downstream ends which are open. Note that, in FIG. 2A, the hatched parts show the stoppers 73u. Therefore, the exhaust gas inflow passages 71i and the exhaust gas outflow passages 71o are alternately arranged through thin partition walls 72. In other words, the exhaust gas inflow passages 71i and the exhaust gas outflow passages 71o are arranged so that each exhaust gas inflow passage 71i is surrounded by four exhaust gas outflow passages 71o and each exhaust gas outflow passage 71o is surrounded by four exhaust gas inflow passages 71i. The partition walls 72 have porosity. Therefore, as shown in FIG. 2B by the arrows, the exhaust gas first flows into the exhaust gas inflow passages 71i, next passes through the insides of the surrounding partition walls 72, and flows out to the insides of the adjoining exhaust gas outflow passages 71o. In another embodiment which is not shown, the exhaust flow passages are comprised of exhaust gas inflow passages with upstream ends and downstream ends which are open and exhaust gas outflow passages with upstream ends which are closed by stoppers and with downstream ends which are open. In this other embodiment as well, the exhaust gas which flows into the exhaust gas inflow passages passes through the partition walls and flows out to the insides of the exhaust gas outflow passages.

As shown in FIG. 2B, at the partition walls 72, micropore zones ZMI are defined at the upstream sides and macropore zones ZMA are defined at the downstream sides. The pore size of the partition walls 72 at the micropore zones is set to enable the particulate matter and the ash to be trapped. As opposed to this, the pore size of the partition walls 72 at the macropore zones is set to enable ash to pass through the partition walls 72 at the macropore zones.

Figure 3:
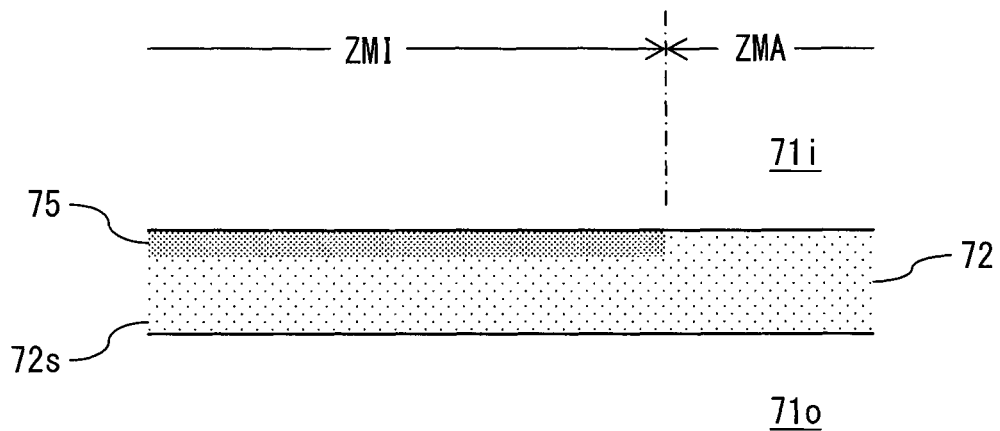
FIG. 3 is a partially enlarged cross-sectional view of a partition wall.
Figure 4:
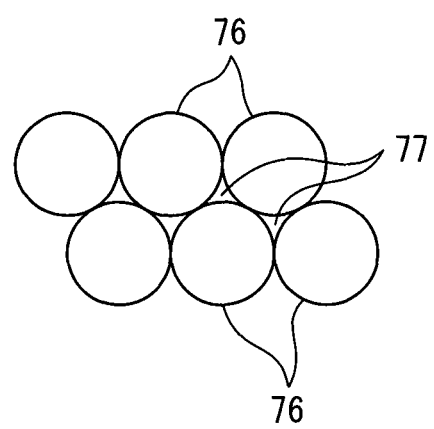
FIG. 4 is a partially enlarged cross-sectional view of a coated layer.

The micropore zones ZMI and macropore zones ZMA are, for example, formed as follows. That is, as shown in FIG. 3, the partition walls 72 are provided with common substrates 72s for the micropore zones ZMI and the macropore zones ZMA. In this case, the pore size of the substrates 72s is set so that the ash can pass through the substrates 72s. Based on this, at the micropore zones ZMI, the surfaces of the substrates 72s are covered by coated layers 75. The coated layers 75, as shown in FIG. 4, are formed from a large number of particles 76 and have a large number of gaps or pores 77 between the particles 76. The pore size of the coated layers 75 is set to be smaller than the pore size of the substrates 72s and to be able to trap the particulate matter and the ash. In this case, the pore size of the coated layers 75 expresses the pore size of the partition walls 72 at the micropore zones. As opposed to this, in the macropore zones ZMA, the surfaces of the substrates 72s are not covered by the above-mentioned coated layers 75. In this case, the pore size of the substrates 72s expresses the pore size of the partition walls 72 at the macropore zones. As a result, the pore size of the partition walls 72 at the micropore zones and the pore size of the partition walls 72 at the macropore zones are set as explained above.

Specifically, the average pore size of the substrates 72s, that is, the average pore size of the partition walls 72 at the macropore zones, is set to 25 μm to 100 μm. The fact that if the average pore size of the substrates 72s is 25 μm or more, the majority of the ash can pass through the substrates 72s was confirmed by the inventors. On the other hand, the average pore size of the coated layers 75, that is, the average pore size of the micropore zones ZMI, is set to 10 μm to 25 μm. For this reason, the average size of the particles 76 (secondary particles) is set to 1 m to 10 μm. If the average particle size of the particles 76 is smaller than 1 μm, the quantity of particulate matter which passes through the coated layers 75 becomes greater than the allowed amount. Further, if the average size of the particles 76 is greater than 10 μm, the pressure loss of the particulate filter 13 or coated layers 75 becomes larger than the allowable value.

Note that, in this embodiment according to the present invention, the particle size of the pores of the partition wall substrates means the median size (50% size) of the distribution of pore size which is obtained by the mercury intrusion technique, while the average size of the particles means the median size (50% size) of the distribution of pore size based on volume which is obtained by the laser diffraction scattering method.

The substrates 72s are formed from a porous material, for example, cordierite, silicon carbide, silicon nitride, zirconia, titania, alumina, silica, mullite, lithium aluminum silicate, zirconium phosphate, or other ceramic. On the other hand, the particles 76 which form the coated layers 75 are, for example, comprised of a metal which has an oxidation function. As a metal which has an oxidation function, platinum Pt, rhodium Rh, palladium Pd, or other such platinum group metal may be used. In another embodiment which is not shown, the particles 76 are comprised of a ceramic similar to the partition wall substrates 72s. In still another embodiment which is not shown, the particles 76 are comprised of both ceramic and metal.

In the embodiment which is shown in FIG. 3, the coated layers 75 are provided on single surfaces of the partition wall substrates 72s which face the exhaust gas inflow passages 71i. In another embodiment which is not shown, the coated layers 75 are provided at single surfaces of the substrates 72s which face the exhaust gas outflow passages 71o. In still another embodiment which is not shown, the coated layers 75 are provided at both surfaces of the substrates 72s which face the exhaust gas inflow passages 71i and exhaust gas outflow passages 71o.

Furthermore, in the embodiment which is shown in FIG. 2B, the upstream edges of the micropore zones ZMI substantially match the upstream ends of the partition walls 72. Further, the downstream edges of the macropore zones ZMA substantially match the downstream ends of the partition walls 72. The longitudinal direction length of the micropore zones ZMI is set to, for example, 50% to 90% of the longitudinal direction length of the particulate filter 13.

Now then, the exhaust gas includes particulate matter which is formed mainly from solid carbon. This particulate matter is trapped on the particulate filter 13. Specifically, the particulate matter is first trapped at the upstream side parts of the partition walls 72, that is, the partition walls 72 at the micropore zones. As the engine operating time becomes longer or as the quantity of particulate matter which is trapped on the particulate filter 13 becomes greater, the zones in the partition walls 72 where the particulate matter builds up expand toward the downstream side.

In the combustion chambers 2, fuel is burned under an excess of oxygen. Therefore, insofar as the fuel injectors 3 and a fuel adding valve do not secondarily feed fuel, the particulate filter 13 is in an oxidizing atmosphere. Further, the coated layers 75 are comprised of a metal which has an oxidation function. As a result, the particulate matter which is trapped on the partition walls 72 at the micropore zones is successively oxidized. In this regard, if the quantity of particulate matter which is trapped per unit time becomes greater than the quantity of particulate matter which is oxidized per unit time, the quantity of particulate matter which is trapped on the particulate filter 13 will increase along with the elapse of the engine operating time. If the quantity of trapped particulate matter on the particulate filter 13 increases, the pressure loss of the particulate filter 13 will end up increasing.

Therefore, in this embodiment according to the present invention, control for removing PM which removes particulate matter from the particulate filter 13 is repeatedly performed. As a result, the particulate matter on the particulate filter 13 is removed and the pressure loss of the particulate filter 13 is reduced.

Figure 5:
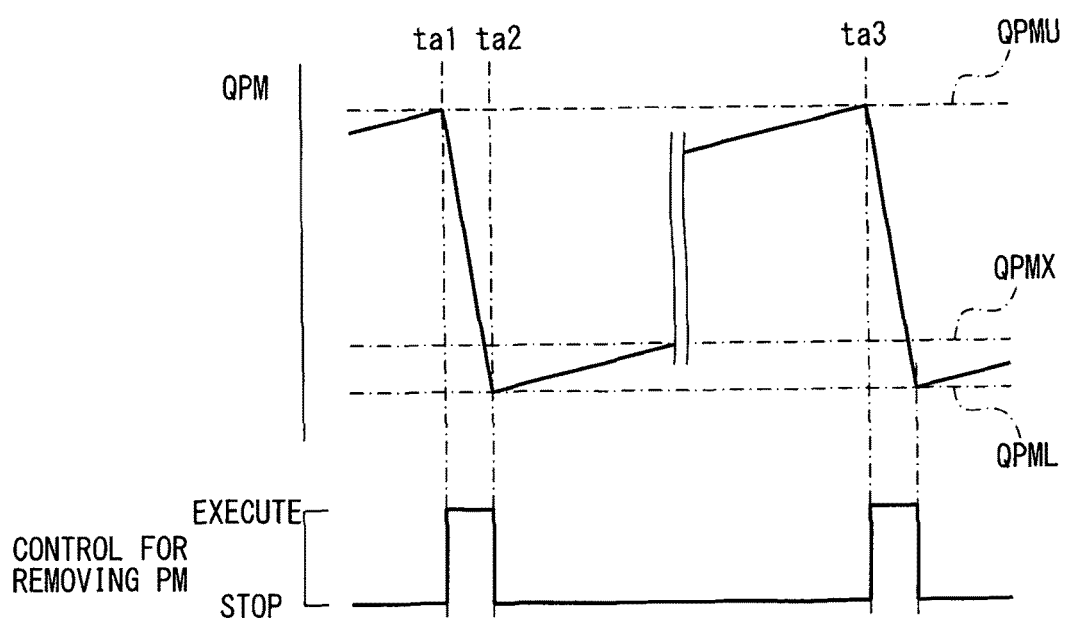
FIG. 5 is a time chart which explains control for removing PM.

That is, as shown in FIG. 5, at the time ta1, if the quantity of particulate matter QPM which is trapped on the particulate filter 13 reaches an upper limit quantity QPMU, control for removing PM, that is, control for raising temperature, is started. As a result, the particulate matter on the particulate filter 13 is removed by oxidation and the quantity of trapped particulate matter QPM is decreased. Next, at the time ta2, if the particulate matter QPM reaches a lower limit amount QPML, the control for removing PM is ended. Next, at the time ta3, if the quantity of trapped particulate matter QPM again reaches the upper limit quantity QPMU, control for removing PM is again started. In this way, control for removing PM is repeatedly performed.

In the embodiment which is shown in FIG. 1, the control for removing PM is comprised of control for raising temperature which increases the temperature of the particulate filter 13 up to a PM removal temperature and maintains the temperature of the particulate filter 13 to the PM removal temperature while maintaining the particulate filter 13 in an oxidizing atmosphere, in order to remove particulate matter by oxidation. To perform control for raising temperature, in one example, the fuel injectors 3 inject additional fuel, separate from the combustion-use fuel, in the compression stroke or exhaust stroke so that this additional fuel burns in the combustion chambers 2, exhaust passage, or particulate filter 13. In another example, a fuel adding valve which is arranged upstream of the particulate filter 13 in the exhaust passage adds additional fuel. This additional fuel is burned in the exhaust passage or particulate filter 13. The PM removal temperature is, for example, set to 600° C. to 650° C. In another embodiment which is not shown, the control for removing PM is comprised of control for increasing $NO_X$ which increases the amount of $NO_X$ in the exhaust gas which flows into the particulate filter 13 in order to remove particulate matter by oxidation. To make the $NO_X$ amount increase, for example, the EGR gas amount is described. In still another embodiment which is not shown, the control for removing PM is comprised of control for feeding ozone which feeds ozone from an ozone feeder which is connected to the exhaust passage upstream of the particulate filter 13 in order to remove particulate matter by oxidation.

The quantity of trapped particulate matter QPM, in one example, is expressed by a pressure difference which is detected by a differential pressure sensor 14. In another example, the quantity of trapped particulate matter QPM is expressed by a counter value which is obtained by repeatedly cumulatively adding an increase qPMi per unit time and a decrease qPMd per unit time (QPM=QPM+qPMi−qPMd). The increase qPMi and the decrease qPMd are respectively calculated based on the engine operating conditions.

In this regard, exhaust gas also contains ash. This ash is also trapped together with the particulate matter on the particulate filter 13. The fact that this ash is mainly formed from calcium sulfate $CaSO_4$, calcium zinc phosphate $Ca_{19}Zn_2(PO_4)_{14}$, or other such calcium salts was confirmed by the inventors. The calcium Ca, zinc Zn, phosphorus P, etc. are derived from the engine lubrication oil, while the sulfur S is derived from the fuel. That is, explaining this taking as an example calcium sulfate $CaSO_4$, the engine lubrication oil flows into the combustion chambers 2 where it is burned. The calcium Ca in the lubrication oil bonds with the sulfur S in the fuel whereby calcium sulfate $CaSO_4$ is formed.

In this regard, even if control for removing PM is performed, the ash will not burn or will not vaporize. That is, the ash will not be removed from the particulate filter 13, but will remain at the partition walls 72 at the micropore zones. As a result, the pressure loss of the particulate filter 13 is liable to be unable to be sufficiently reversed.

Therefore, in a first embodiment according to the present invention, it is judged if the quantity of trapped particulate matter QPM on the particulate filter 13 is smaller than a predetermined limit quantity QPMX. When it is judged that the quantity of trapped particulate matter QPM is smaller than the limit quantity QPMX, control for increasing gas which temporarily increases the gas which flows into the particulate filter 13 in order to remove the ash from the particulate filter 13, is performed. As a result, the ash on the partition walls 72 at the micropore zones is moved to the partition walls 72 at the macropore zones and can easily pass through the partition walls 72 at the macropore zones. Therefore, the increase in pressure loss of the particulate filter 13 due to ash is suppressed.

Figure 6A:
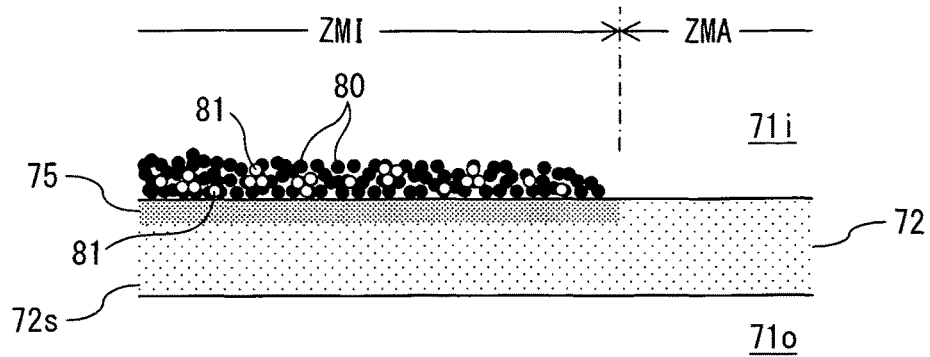
FIG. 6A is a schematic enlarged view of a partition wall for explaining an embodiment according to the present invention.
Figure 6B:
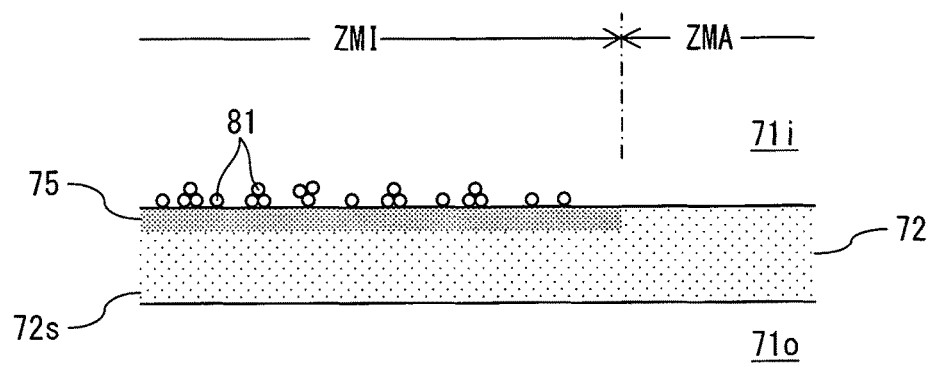
FIG. 6B is a schematic enlarged view of a partition wall for explaining an embodiment according to the present invention.
Figure 6C:
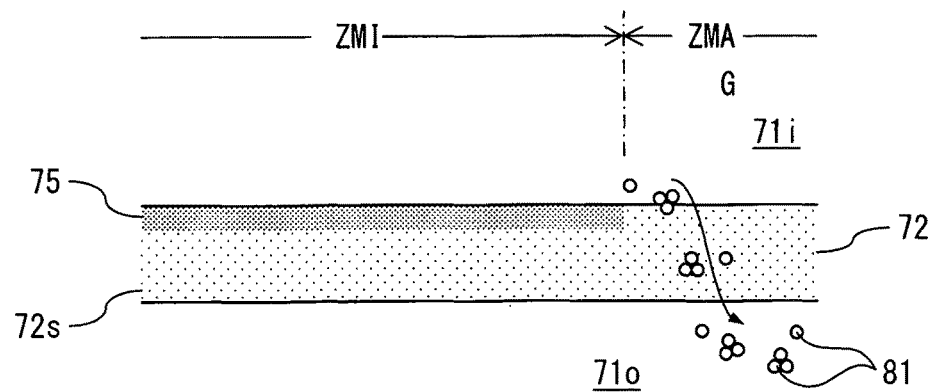
FIG. 6C is a schematic enlarged view of a partition wall for explaining an embodiment according to the present invention.

That is, when the quantity of trapped particulate matter QPM is relatively large, as shown in FIG. 6A, the particulate matter 80 and the ash 81 are mainly trapped at partition walls 72 at the micropore zones. Next, if the quantity of trapped particulate matter QPM becomes smaller than the limit quantity QPMX by, for example, performing control for removing PM, as shown in FIG. 6B, almost all of the ash 81 remains on the partition walls 72 at the micropore zones. Next, if control for increasing gas is performed, as shown in FIG. 6C, the ash 81 is moved from the micropore zones ZMI to the macropore zones ZMA. This ash 81 next passes through the partition walls 72 at the macropore zones and flows into the exhaust gas outflow passages 71o. In this way, the ash 81 is removed from the particulate filter 13.

In the embodiment which is shown in FIG. 1, control for increasing gas is performed by performing control for increasing exhaust gas which temporarily increases the flow rate of the exhaust gas which flows into the particulate filter 13, that is, the volume flow rate or mass flow rate. In order to perform control for increasing exhaust gas, in one example, the engine load or the fuel injection quantity is increased. In another example, the engine speed is increased. In still another example, the fuel injection timing is retarded. In still another example, the opening timing of the exhaust valve is retarded. In still another example, the EGR control valve 17 is closed. In still another example, the opening area of a variable nozzle which is provided at the exhaust turbine 7b is decreased. In still another example, an automatic transmission to which the output shaft of the engine body 1 is connected is used to control the transmission ratio so that the engine speed is increased. In this case, the transmission ratio is preferably changed without changing the engine output.

In this way, in the first embodiment according to the present invention, control for increasing gas is performed, so the ash can be reliably removed from the particulate filter 13. Therefore, the increase of pressure loss of the particulate filter 13 due to the ash can be suppressed.

If control for increasing gas is performed, the particulate matter 80 which is present at the micropore zones ZMI may also move together with the ash 81 to the macropore zones ZMA, may pass through the partition walls 72 at the macropore zones, and therefore may be discharged from the particulate filter 13. However, in the first embodiment according to the present invention, when the quantity of trapped particulate matter QPM is small, control for increasing gas is performed, so the quantity of particulate matter which passes through the partition walls 72 at the macropore zones can be decreased.

Further, if the quantity of trapped particulate matter QPM becomes greater, part of the particulate matter 80 is sometimes trapped at the partition walls 72 at the macropore zones. If particulate matter 80 is trapped at the partition walls 72 at the macropore zones, the pores at the partition walls 72 at the macropore zones become clogged with particulate matter 80, and it becomes difficult for the ash 81 to pass through the partition walls 72 at the macropore zones. In the first embodiment according to the present invention, when the quantity of trapped particulate matter QPM is small, control for increasing gas is performed, so the partition walls 72 at the macropore zones are not clogged by particulate matter 80. Therefore, the ash 81 can easily pass through the partition walls 72 at the macropore zones.

Here, the quantity of trapped particulate matter QPM becomes smaller than the limit quantity QPMX when control for removing PM is performed and also when engine high load operation continues over a long period of time etc. Note that, one example of the limit quantity QPMX is shown in FIG. 5.

Figure 7:
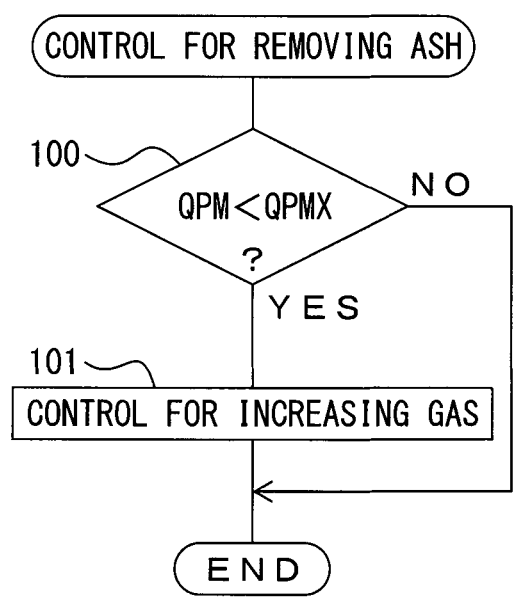
FIG. 7 is a flow chart which shows a routine for control for removing ash of a first embodiment according to the present invention.

FIG. 7 shows a routine which performs the control for removing ash of the first embodiment according to the present invention. This routine is performed by interruption every predetermined set time period.

Referring to FIG. 7, at step 100, it is judged if the quantity of trapped particulate matter QPM is smaller than the limit quantity QPMX. When QPM≥QPMX, the processing cycle ends. That is, control for increasing gas is not performed. As opposed to this, when QPM<QPMX, next the routine proceeds to step 101 where control for increasing gas is performed.

In the first embodiment mentioned above, the quantity of trapped particulate matter QPM is calculated. The calculated quantity of trapped particulate matter QPM is compared with the limit quantity QPMX, whereby it is judged if the quantity of trapped particulate matter QPM is smaller than the limit quantity QPMX. In another embodiment which is not shown, it is judged if control for removing PM has ended, and it is judged that the quantity of trapped particulate matter QPM is smaller than the limit quantity QPMX when control for removing PM has ended. In this case, control for increasing gas is performed in succession to control for removing PM.

Next, a second embodiment according to the present invention will be explained. Different points between the first and second embodiments will be explained below.

If the above-mentioned control for increasing exhaust gas is performed, the engine output, noise, vibration, etc. temporarily increase. As a result, the drivability is liable to deteriorate.

Therefore, in the second embodiment according to the present invention, when it is judged that the quantity of trapped particulate matter QPM is smaller than the limit quantity QPMX, it is judged if an execution condition for control for increasing gas based on the engine operating condition stands. It is judged that the execution condition stands when the drivability is difficult to deteriorate even with control for increasing gas, that is, for example, when the engine is in a high load operation, when the engine is in an idling operation, or when a clutch is in a disengaged state, and it is judged that the execution condition does not stand otherwise. Based on this, control for increasing gas is not performed when it is judged that the execution condition does not stand, while control for increasing gas is performed when the execution condition stands. As a result, deterioration of drivability due to control for increasing gas is suppressed.

Figure 8:
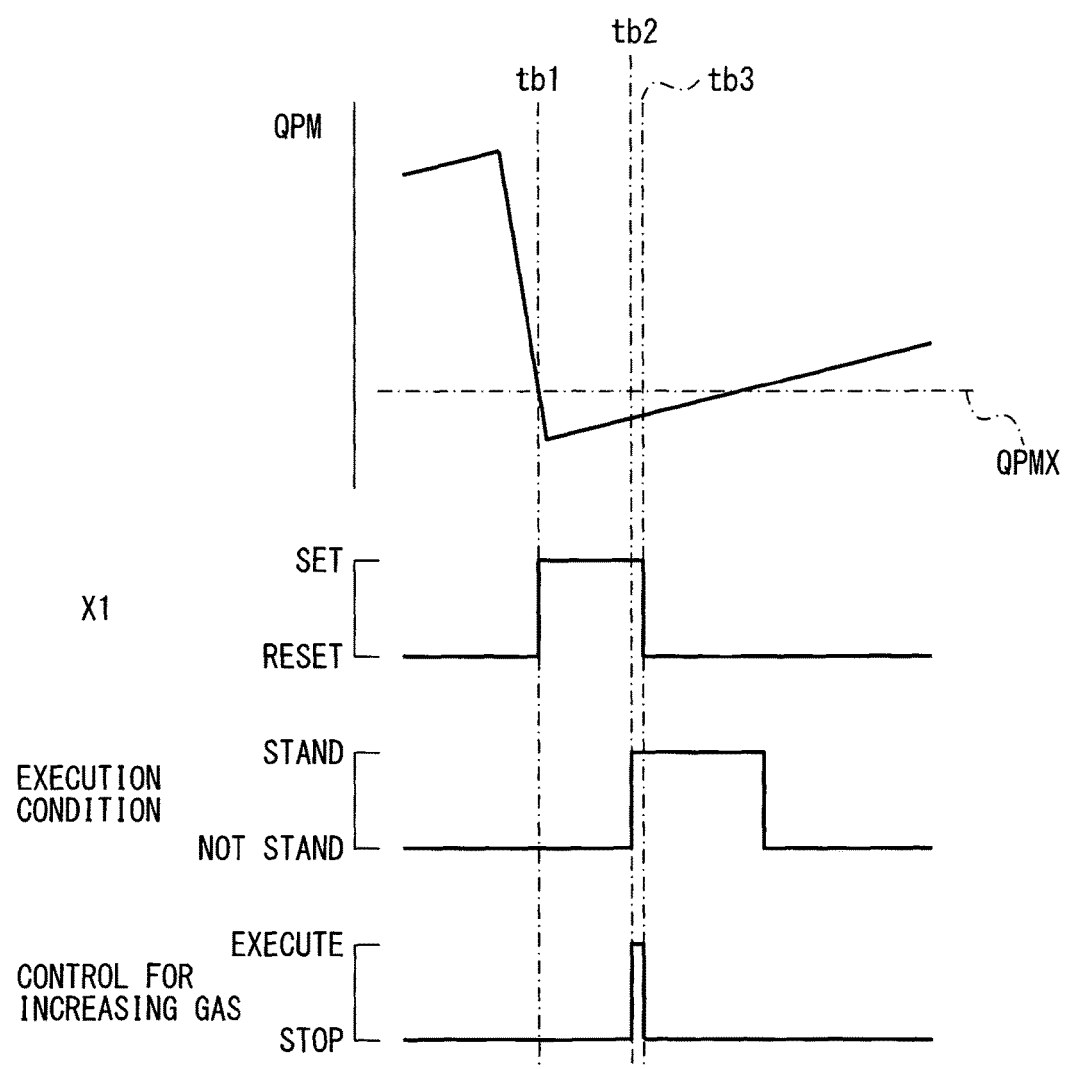
FIG. 8 is a time chart which explains a second embodiment according to the present invention.
Figure 9:
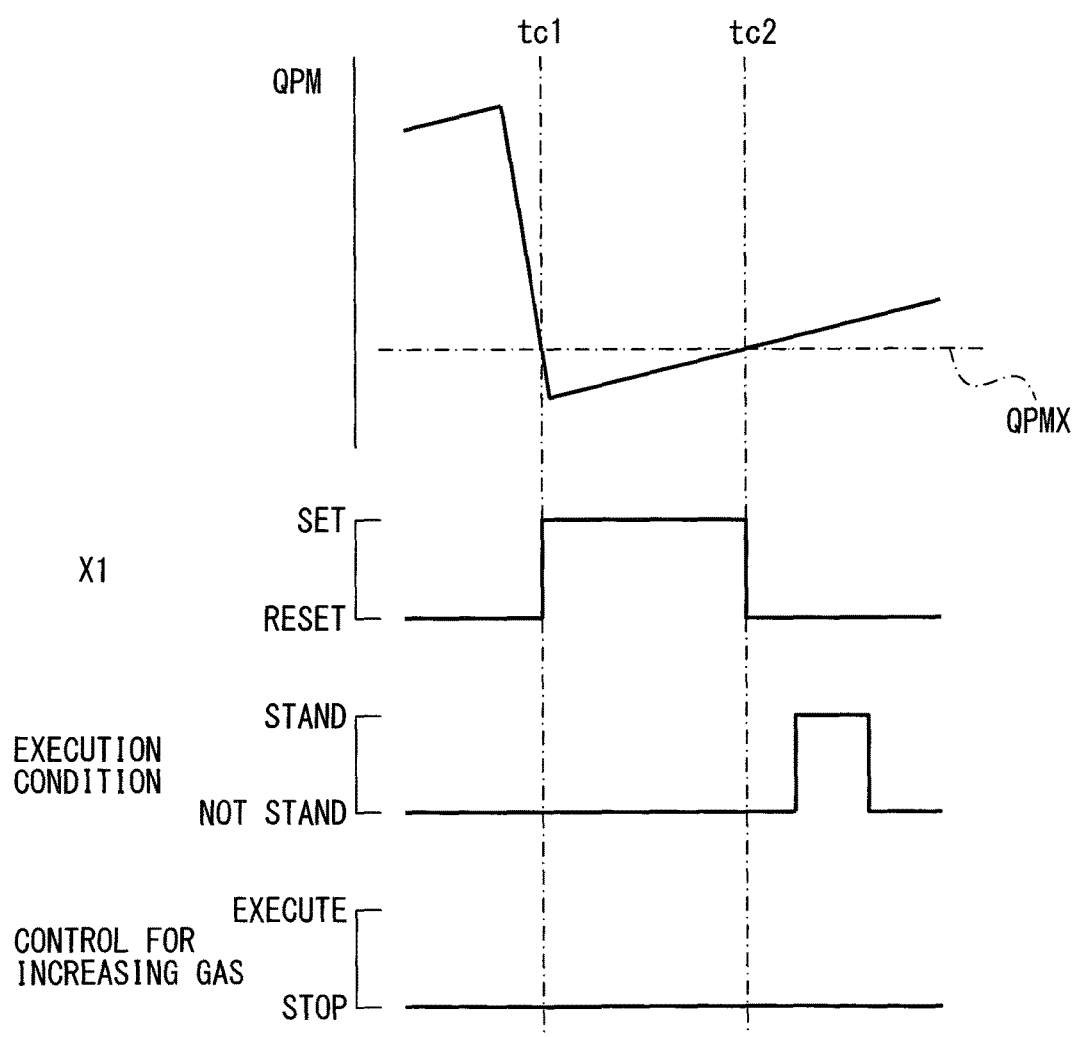
FIG. 9 is a time chart which explains a second embodiment according to the present invention.

While referring to FIG. 8 and FIG. 9, the second embodiment according to the present invention will be further explained. In FIG. 8 and FIG. 9, a first flag X1 is set when control for increasing gas should be performed (X1=1) and is reset (X1=0) otherwise. Specifically, the first flag X1 is set when the quantity of trapped particulate matter QPM becomes smaller than the limit quantity QPMX and is reset when control for increasing gas is performed or the quantity of trapped particulate matter QPM becomes greater than the limit quantity QPMX. In another embodiment which is not shown, the first flag X1 is set when control for removing PM ends.

Referring to FIG. 8, at the time tb1, if the quantity of trapped particulate matter QPM becomes smaller than the limit quantity QPMX, the first flag X1 is set (X1=1). In the embodiment which is shown in FIG. 8, at this time, the execution condition based on the engine operating conditions does not stand, therefore control for increasing gas is not performed. Next, at the time tb2, if the execution condition stands, control for increasing gas is started. Next, at the time tb3, if control for increasing gas is ended, the first flag X1 is reset (X1=0). By doing this, when the quantity of trapped particulate matter QPM is smaller than the limit quantity QPMX, control for increasing gas is kept from being repeatedly performed. In another embodiment which is not shown, when the quantity of trapped particulate matter QPM is smaller than the limit quantity QPMX, control for increasing gas is repeatedly performed.

On the other hand, referring to FIG. 9, at the time tc1, if the quantity of trapped particulate matter QPM becomes smaller than the limit quantity QPMX, the first flag X1 is set (X1=1). In the embodiment which is shown in FIG. 9, at this time, the execution condition based on the engine operating condition does not stand, therefore control for increasing gas is not performed. Next, at the time tc2, if the particulate matter QPM becomes greater than the limit quantity QPMX, the first flag X1 is reset (X1=0). Therefore, in the embodiment which is shown in FIG. 9, control for increasing gas is not performed. Note that, when the first flag X1 is reset, even if the execution condition stands, control for increasing gas is not performed.

Figure 10:
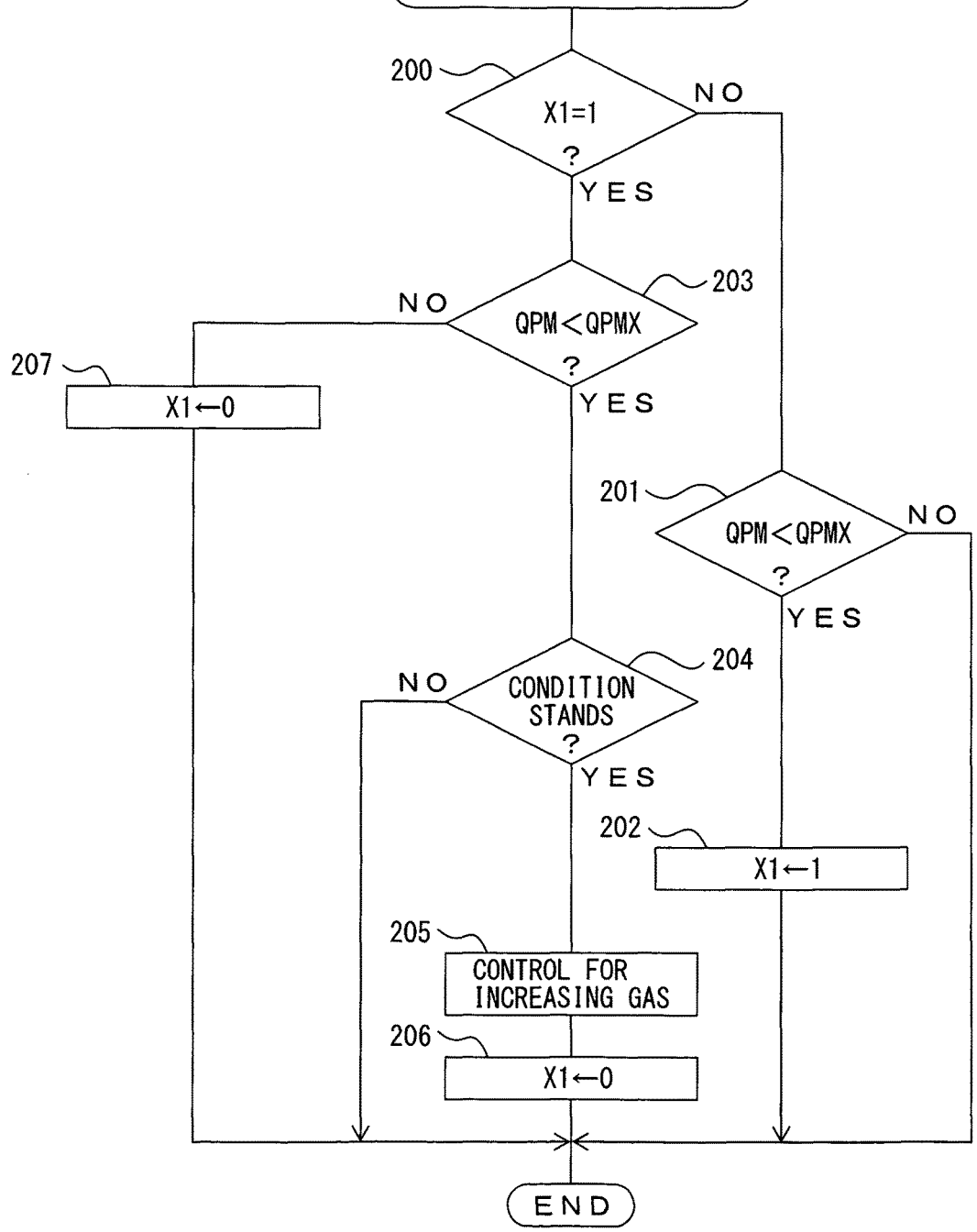
FIG. 10 is a flow chart which shows a routine for control for removing ash of a second embodiment according to the present invention.

FIG. 10 shows a routine for control for removing ash of the second embodiment according to the present invention. This routine is performed by interruption every predetermined set time period.

Referring to FIG. 10, at step 200, it is judged if the first flag X1 is set (X1=1). When the first flag X1 is reset (X1=0), the routine proceeds to step 201 where it is judged if the quantity of trapped particulate matter QPM is smaller than the limit quantity QPMX. When QPM≥QPMX, the processing cycle is ended. When QPM<QPMX, the routine proceeds from step 201 to step 202 where the first flag X1 is set (X1=1).

When the first flag X1 is set (X1=1), the routine proceeds from step 200 to step 203 where it is judged if the quantity of trapped particulate matter QPM is smaller than the limit quantity QPMX. When QPM<QPMX, the routine proceeds to step 204 where it is judged if the execution condition for control for increasing gas based on the engine operating conditions stands. When the execution condition does not stand, the processing cycle is ended. That is, control for increasing gas is not performed. When the execution condition stands, the routine proceeds from step 204 to step 205 where control for increasing gas is performed. At the following step 206, the first flag X1 is reset (X1=0). On the other hand, when, at step 203, QPM≥QPMX, the routine proceeds to step 207 where the first flag X1 is reset (X1=0). In this case as well, control for increasing gas is not performed.

Figure 11:
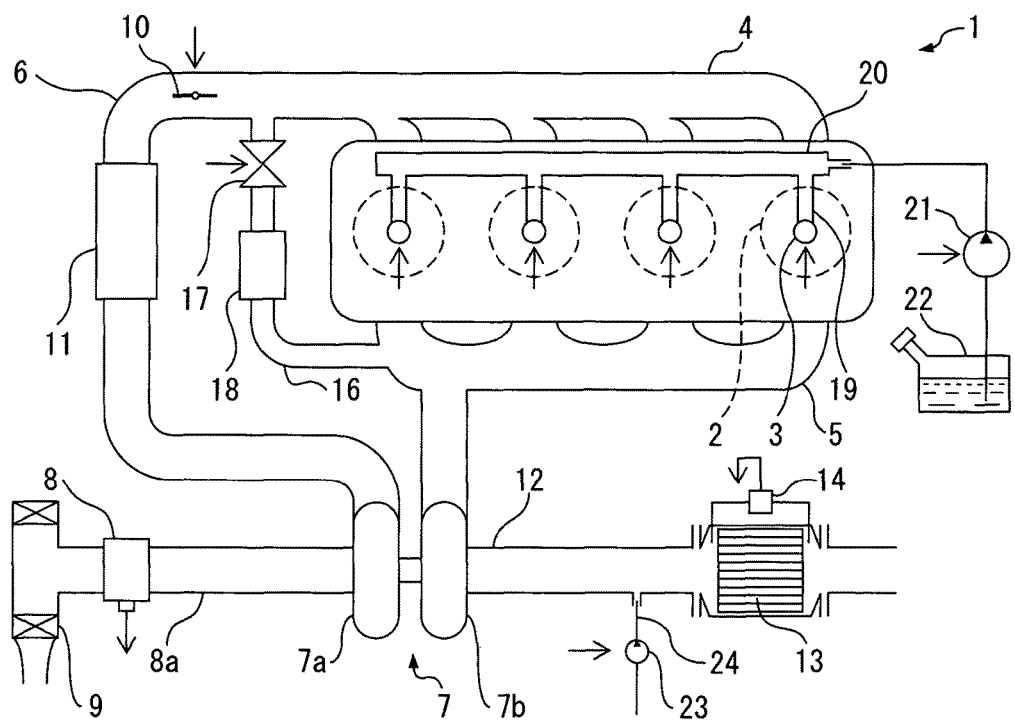
FIG. 11 is an overall view of an internal combustion engine of a third embodiment according to the present invention.

FIG. 11 shows a third embodiment according to the present invention.

In the third embodiment which is shown in FIG. 11, an air pump 23 is provided. The discharge side of the air pump 23 is connected to the exhaust pipe 12 upstream of the particulate filter 13.

In the third embodiment which is shown in FIG. 11, it is possible to perform control for removing PM which is different from the above-mentioned control for removing PM. That is, the air pump 23 feeds secondary air to the particulate filter 13 in order to remove particulate matter on the particulate filter 13 by oxidation. This different control for removing PM can be performed both while the engine is operating and while engine operation is stopped.

Further, in the third embodiment which is shown in FIG. 11, control for increasing gas which is different from the above-mentioned control for increasing exhaust gas can be performed. That is, control for increasing gas is performed by performing control for feeding secondary air which feeds secondary air from the air pump 23. This control for feeding secondary air can be performed both while the engine is operating and while the engine operation is stopped.

In the second embodiment which is shown in FIG. 8 and FIG. 9, control for increasing gas is not performed if the execution condition based on the engine operating conditions does not stand in the time period when the first flag X1 is set. In this regard, if the state where control for increasing gas is not performed is repeated, the amount of ash which is trapped on the particulate filter 13 ends up increasing.

Therefore, in the third embodiment according to the present invention, it is judged if the quantity of trapped ash on the particulate filter 13 is greater than a predetermined set amount. When it is judged that the quantity of trapped ash is greater than the set amount, the control for increasing gas, that is, control for feeding secondary air, is performed at the time of the following engine stopping. If doing this, even if control for increasing gas is not performed during engine operation and the quantity of trapped ash increases, control for increasing gas is performed while the engine is stopped, therefore the quantity of trapped ash can be decreased.

Figure 12:
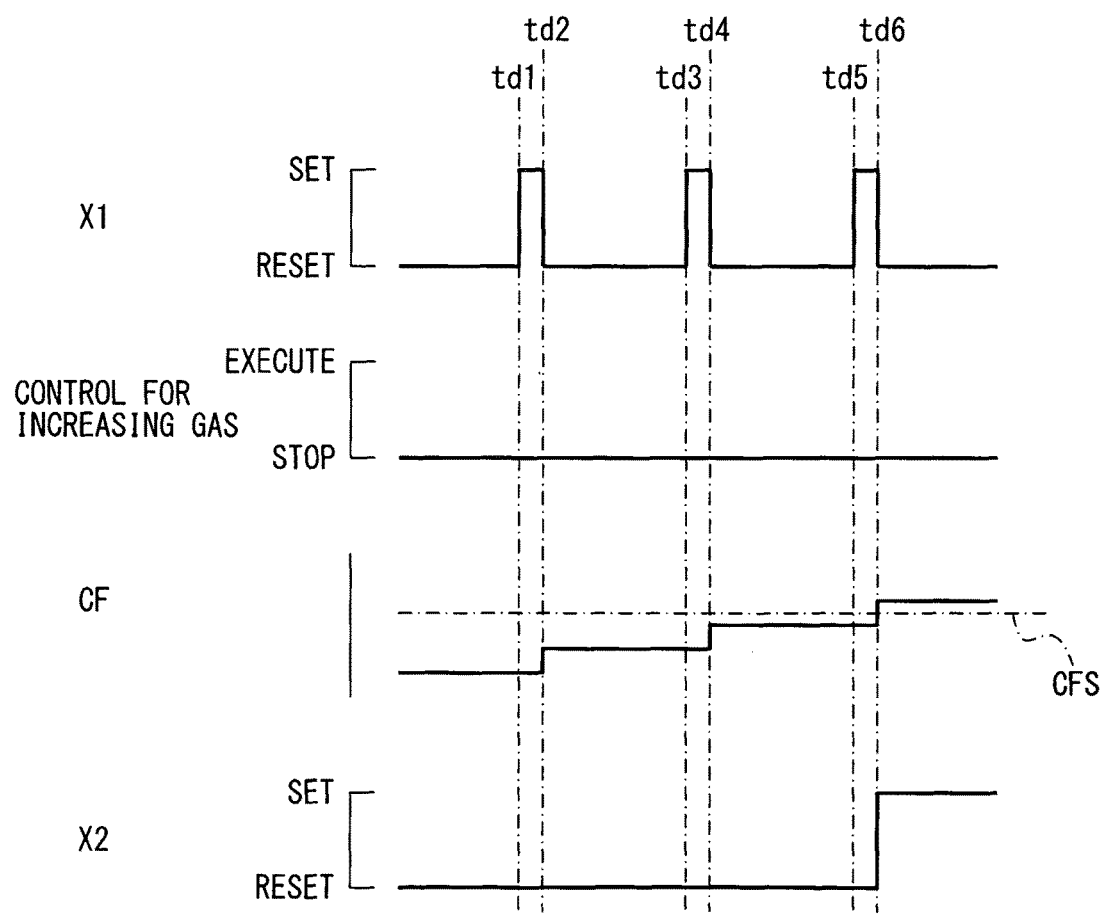
FIG. 12 is a time chart which explains a third embodiment according to the present invention.
Figure 13:
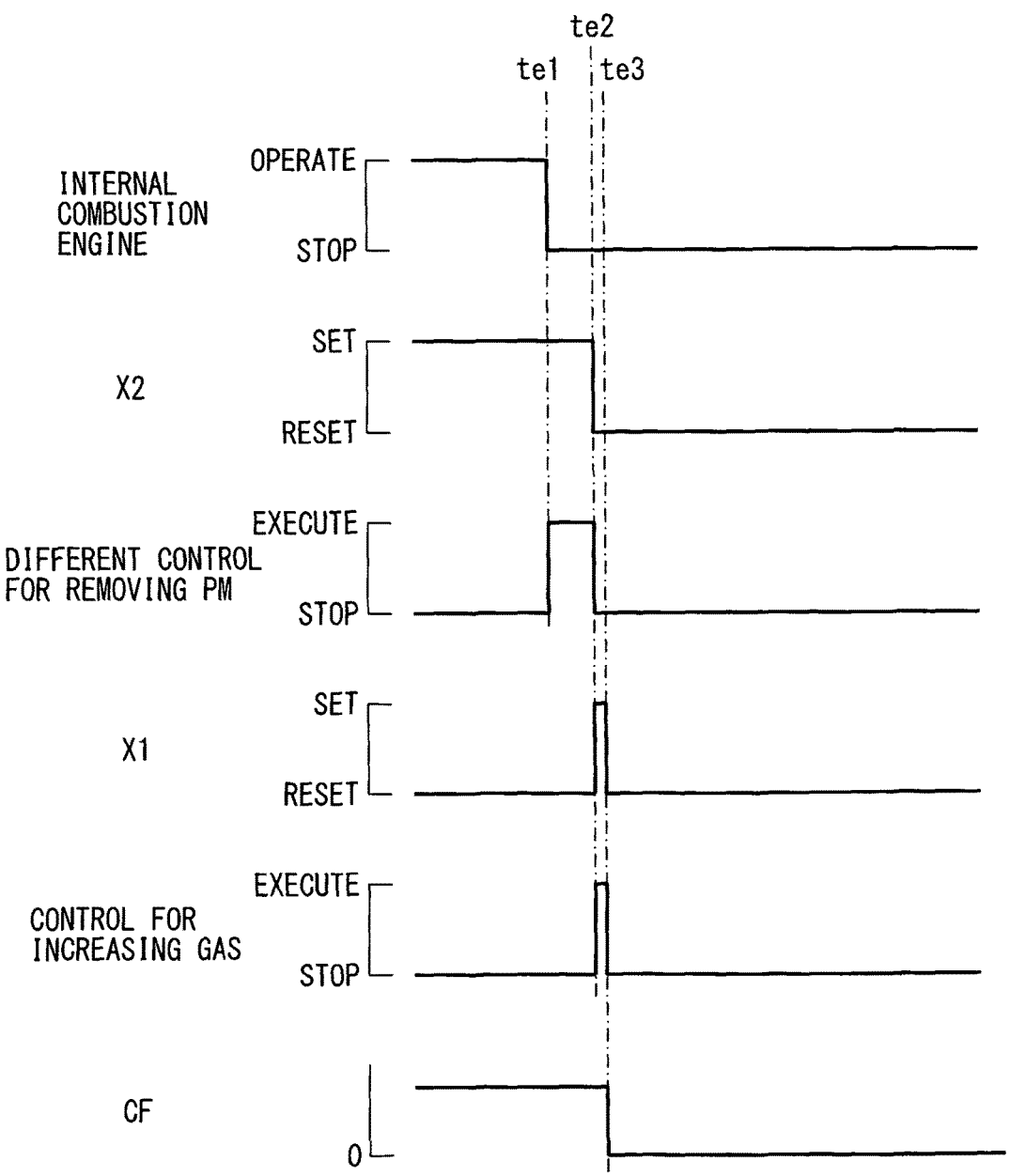
FIG. 13 is a time chart which explains a third embodiment according to the present invention.

While referring to FIG. 12 and FIG. 13, the third embodiment according to the present invention will be explained. In FIG. 12 and FIG. 13, a second flag X2 is set when the different control for removing PM should be performed (X2=1) and is reset (X2=0) otherwise. On the other hand, a counter value CF expresses the quantity of trapped ash on the particulate filter 13. When the counter value CF is larger than the set value CFS, it is judged that the quantity of trapped ash is larger than the set amount.

Referring to FIG. 12, at the time td1, the first flag X1 is set (X1=1), while at the time td2, the first flag X1 is reset (X1=0). In the time period from this time td1 to the time td2, control for increasing gas is not performed. Therefore, at the time td2, the counter value CF is incremented by "1". In the same way, control for increasing gas is not performed in the time period from the time td3 to the time td4 at which the first flag X1 is set. Therefore, at the time td4, the counter value CF is incremented by "1". In the same way, control for increasing gas is not performed during the time period from the time td5 to the time td6 at which the first flag X1 is set. Therefore, at the time td6, the counter value CF is incremented by "1". At this time, the counter value CF becomes larger than the set value CFS and as a result the second flag X2 is set (X2=1).

Referring to FIG. 13, at the time te1, the engine operation is stopped. At this time, the second flag X2 is set (X2=1), so the different control for removing PM is started. Next, at the time te2, if the different control for removing PM is ended, the second flag X2 is reset (X2=0). If the different control for removing PM is performed, the quantity of trapped particulate matter QPM is made smaller than the limit quantity QPMX. As a result, the first flag X1 is set (X1=1). If the first flag X1 is set, control for increasing gas, that is, control for feeding secondary air is performed. Therefore, the ash is removed from the particulate filter 13. Next, at the time te3, if control for increasing gas is ended, the first flag X1 is reset (X1=0). Further, the counter value CF is cleared (CF=0).

Figure 14:
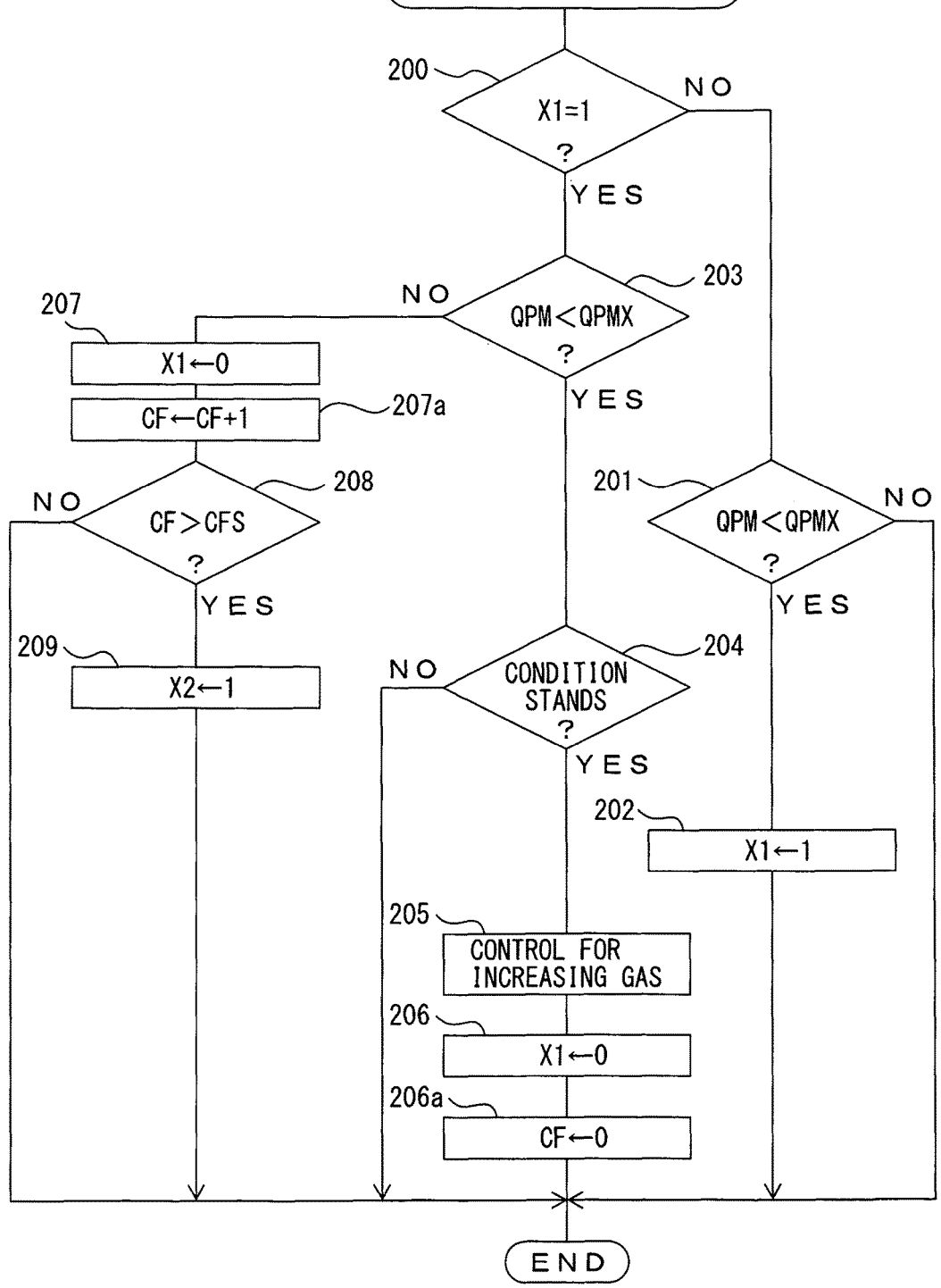
FIG. 14 is a flow chart which shows a routine for control for removing ash of a third embodiment according to the present invention.

FIG. 14 shows a routine which performs the control for removing ash of the third embodiment which is shown in FIG. 12 and FIG. 13. This routine is performed by interruption every predetermined set time period.

The routine which is shown in FIG. 14 differs from the routine which is shown in FIG. 10 on the following points.

The routine proceeds from step 206 to step 206a where the counter value CF is cleared (CF=0).

When, in the state where the first flag X1 is set, the quantity of trapped particulate matter QPM becomes larger than the limit quantity QPMX, the routine proceeds from step 203 to step 207 where the first flag X1 is reset (X1=0). At the following step 207a, the counter value CF is incremented by "1" (CF=CF+1). At the following step 208, it is judged if the counter value CF is larger than the set value CFS. When CF≤CFS, the processing cycle is ended. When CF>CFS, the routine proceeds to step 209 where the second flag X2 is set (X2=1).

Figure 15:
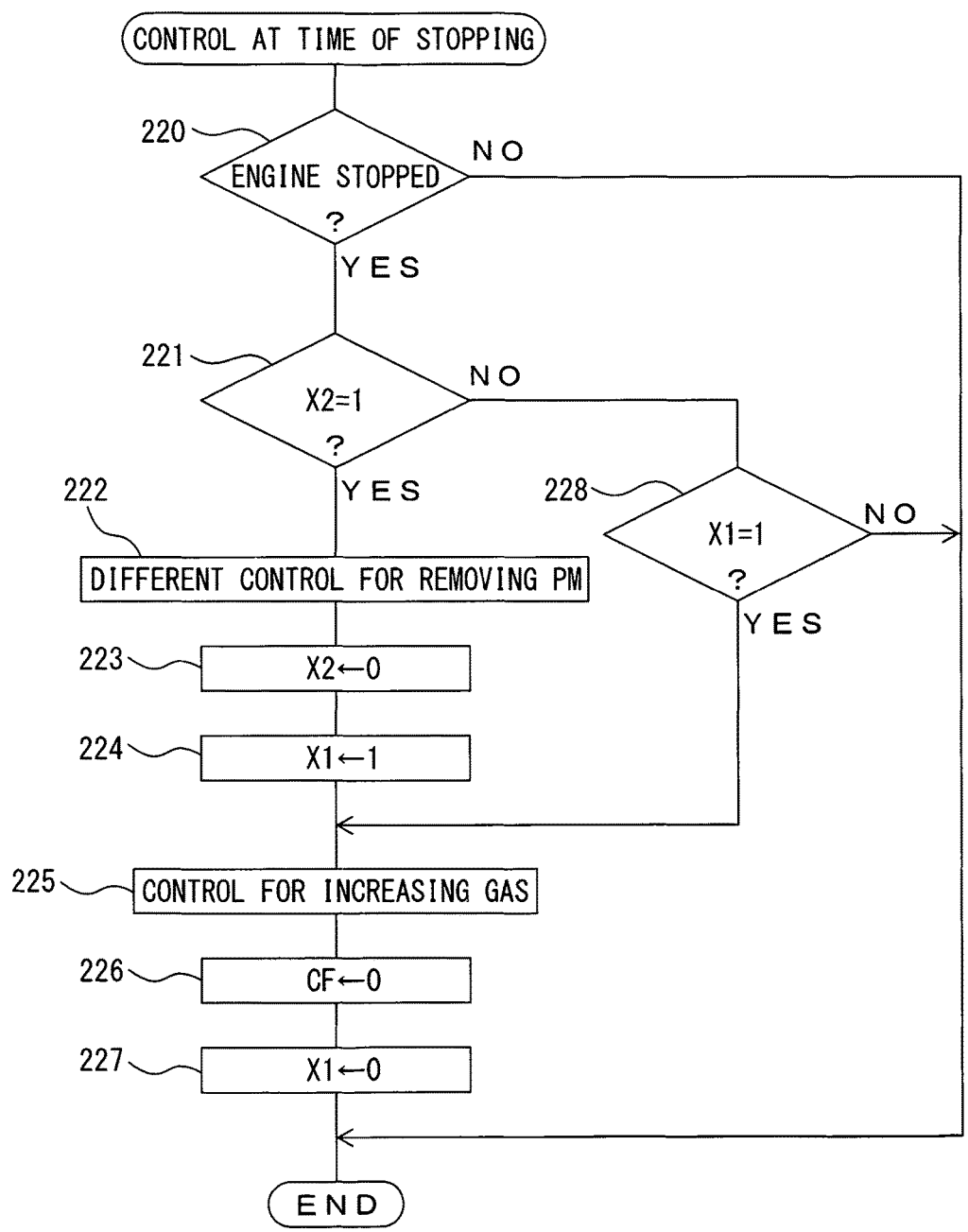
FIG. 15 is a flow chart which shows a routine for control at the time of stopping of a third embodiment according to the present invention.

FIG. 15 shows a routine for control at the time of stopping, which is shown in FIG. 12 and FIG. 13. This routine is performed by interruption every predetermined set time period.

Referring to FIG. 15, at step 220, it is judged if the engine operation is stopped. If the engine operation has not been stopped, that is, during engine operation, the processing cycle is ended. When engine operation has been stopped, the routine proceeds to step 221 where it is judged if the second flag X2 is set. When the second flag X2 is set (X2=1), next the routine proceeds to step 222 where the different control for removing PM is performed. At the following step 223, the second flag X2 is reset (X2=0), while at the following step 224, the first flag X1 is set (X1=1). At the following step 225, control for increasing gas, that is, control for secondarily feeding air is performed. At the following step 226, the counter value CF is cleared (CF=0). At the following step 227, the first flag X1 is reset (X1=0).

As opposed to this, when the second flag X2 is reset (X2=0), the routine proceeds from step 221 to step 228 where it is judged if the first flag X1 is set. When the first flag X1 is set (X1=1), the routine jumps to step 225. In this case, control for increasing gas is performed without the different control for removing PM. On the other hand, when the first flag X1 is reset (X1=0), the processing cycle is ended.

Next, referring to FIG. 16, still another embodiment according to the present invention will be explained.

In the third embodiment which is shown in FIG. 12 and FIG. 13, when it is judged that the quantity of trapped ash is greater than the set amount, control for increasing gas, that is, control for secondarily feeding air, is performed at the time of the following engine stopping. As opposed to this, in the fourth embodiment which is shown in FIG. 16, when it is judged that the quantity of trapped ash is greater than a set amount, control for increasing gas is performed at the time of the following engine restart.

Figure 16:
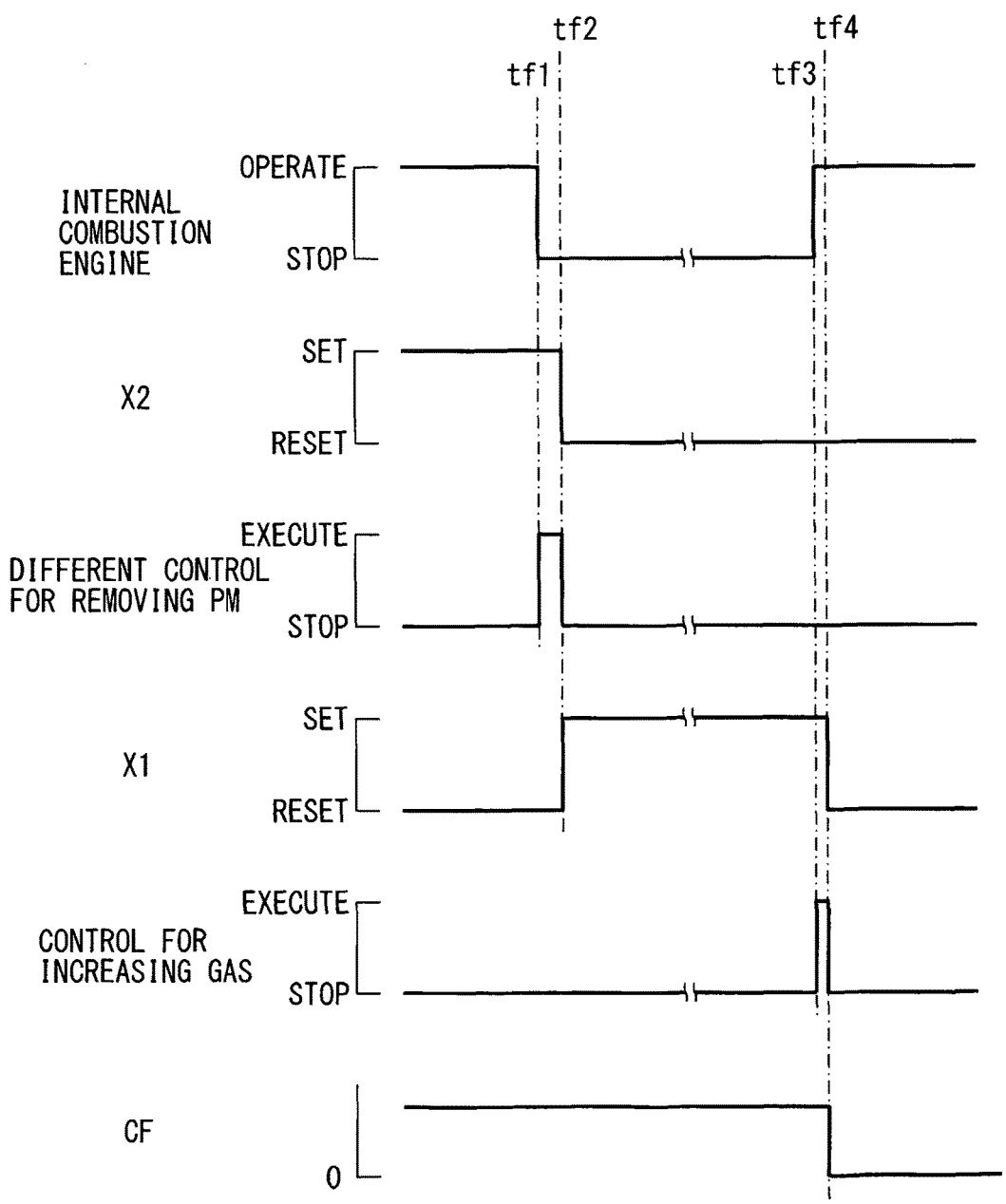
FIG. 16 is a time chart which explains a fourth embodiment according to the present invention.

That is, as shown in FIG. 16, at the time tf1, engine operation is stopped. At this time, the second flag X2 is set (X2=1), so the different control for removing PM is started. Next, at the time tf2, if the different control for removing PM is ended, the second flag X2 is reset (X2=0) and the first flag X1 is set (X1=1). Next, at the time tf3, the engine is restarted. At this time, the first flag X1 is set, so control for increasing gas is performed. In this case, control for increasing gas is performed by control for increasing exhaust gas or control for secondarily feeding air. Next, at the time tf4, if control for increasing gas ends, the first flag X1 is reset (X1=0). Further, the counter value CF is cleared (CF=0).

Figure 17:
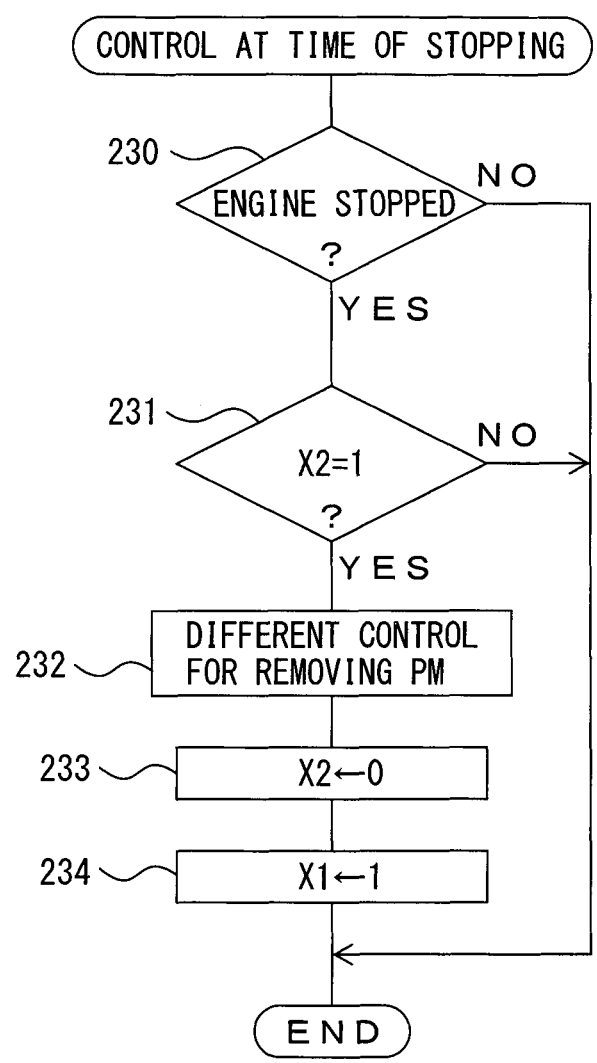
FIG. 17 is a flow chart which shows a routine for control at the time of stopping of a fourth embodiment according to the present invention.

FIG. 17 shows a routine for control at the time of stopping in the fourth embodiment which is shown in FIG. 16. This routine is performed by interruption every predetermined set time period.

Referring to FIG. 17, at step 230, it is judged if the engine operation has been stopped. When the engine operation has not been stopped, that is, during engine operation, the processing cycle ends. When the engine operation has been stopped, the routine proceeds to step 231 where it is judged if the second flag X2 has been set. When the second flag X2 has been reset (X2=0), the processing cycle is ended. When the second flag X2 has been set (X2=1), next the routine proceeds to step 232 where the different control for removing PM is performed. At the following step 233, the second flag X2 is reset (X2=0), then at the following step 234, the first flag X1 is set (X1=1).

Figure 18:
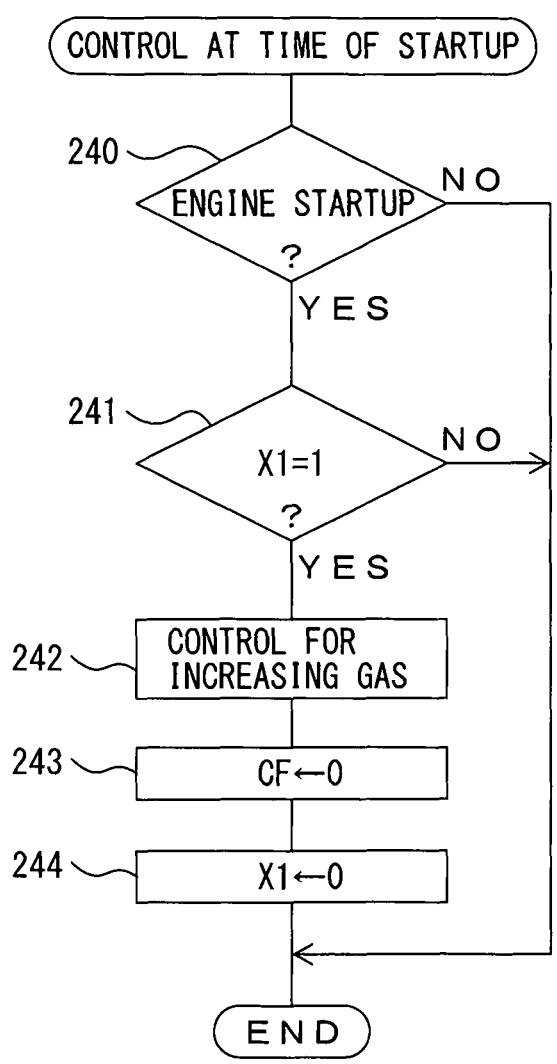
FIG. 18 is a flow chart which shows a routine for control at the time of startup of a fourth embodiment according to the present invention.

FIG. 18 shows the routine for control at the time of startup in the embodiment which is shown in FIG. 16. This routine is performed by interruption every predetermined set time period.

Referring to FIG. 18, at step 240, it is judged if the engine is being started up. When the engine is not being started up, the processing cycle is ended. When the engine is being started up, next the routine proceeds to step 241 where it is judged if first flag X1 is set. When the first flag X1 is reset (X1=0), the processing cycle is ended. When the first flag X1 is set (X1), the routine proceeds to step 242 where control for increasing gas is performed. At the following step 243, the counter value CF is cleared (CF=0). At the following step 244, the first flag X1 is reset (X1=0). Note that, in the fourth embodiment which is shown in FIG. 16, for example, the routine of the control for removing ash which is shown in FIG. 14 is performed.

Combining the third embodiment which is shown in FIG. 13 and the fourth embodiment which is shown in FIG. 16, it is judged if the quantity of trapped ash is greater than a predetermined set amount and, when the quantity of trapped ash is greater than the set amount, control for increasing gas is performed at the time of the following engine stopping or at the time of the following engine restarting. Further, when control for increasing gas should be performed at the time of stopping engine operation or at the time of restarting the engine, the quantity of trapped particulate matter on the particulate filter is decreased before control for increasing gas.

In another embodiment which is not shown, when it is judged that the quantity of trapped ash is greater than a set amount, control for increasing gas is performed even if it is judged that the execution condition for control for increasing gas based on the engine operating condition does not stand. If doing this, there is no need for control for increasing gas and the different control for removing PM at the time of stopping the engine or at the time of restarting the engine.

Next, a fifth embodiment according to the present invention will be explained.

If engine acceleration operation is performed, the flow rate of the exhaust gas which flows into the particulate filter 13 increases.

Therefore, in the fifth embodiment according to the present invention, when an engine acceleration operation is performed when control for increasing gas should be performed, the control for increasing gas is omitted. As a result, it is possible to prevent control for increasing gas from causing the consumed energy to increase. In this case, when the rate of change of the engine load is larger than a predetermined set rate, it is judged that an engine acceleration operation has been performed. When the rate of change of the engine load is larger than the predetermined set rate, the flow rate of the exhaust gas which flows into the particulate filter 13 is equal to or larger than the flow rate of exhaust gas when control for increasing exhaust gas has been performed.

Figure 19:
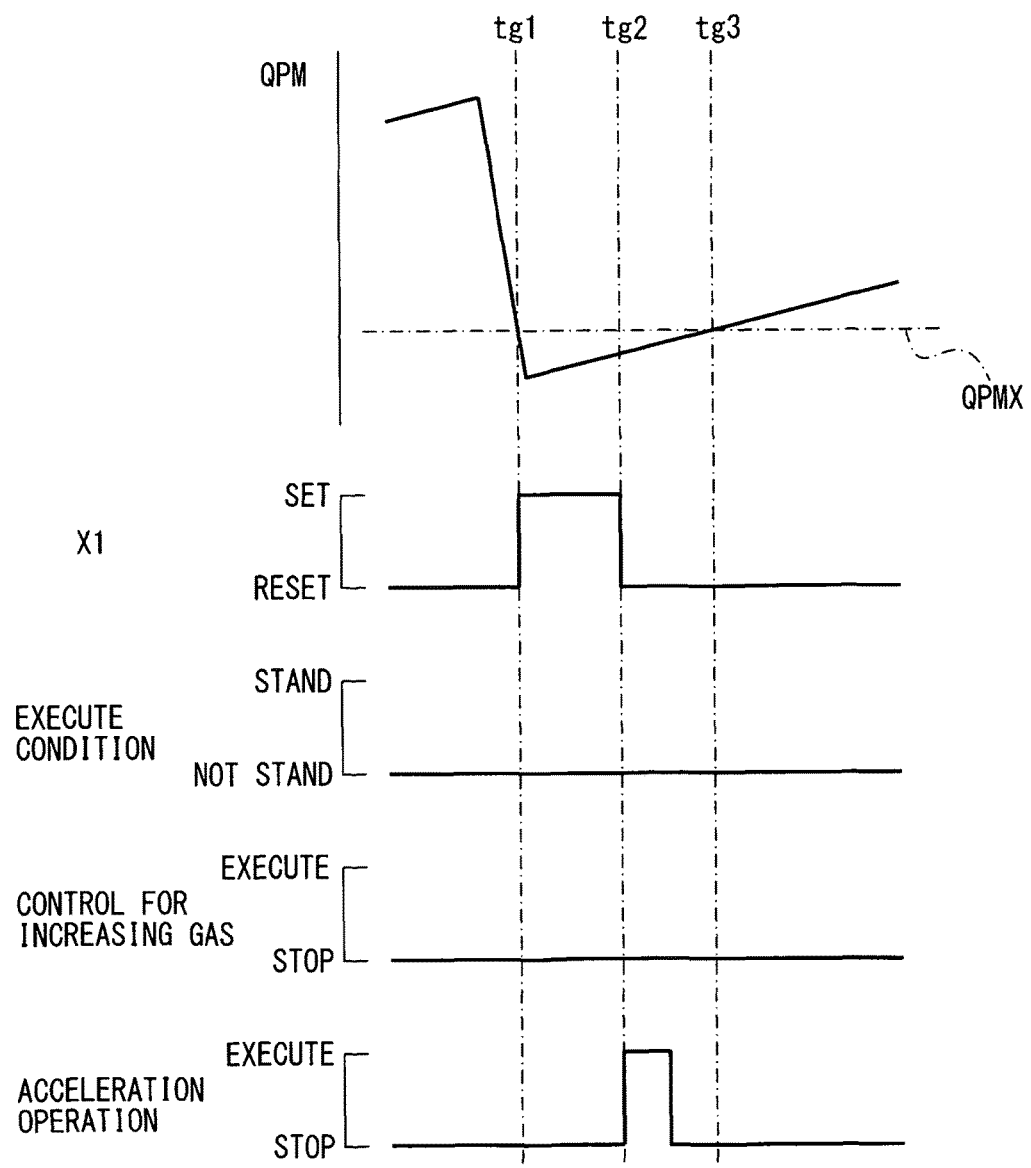
FIG. 19 is a time chart which explains a fifth embodiment according to the present invention.

That is, as shown in FIG. 19, at the time tg1, the first flag X1 is set (X1=1). Next, at the time tg2, if an engine acceleration operation is performed, the first flag X1 is reset (X1=0). Therefore, up to the time tg3, the quantity of trapped particulate matter QPM is smaller than the limit quantity QPMX, but control for increasing gas is not performed.

Figure 20:
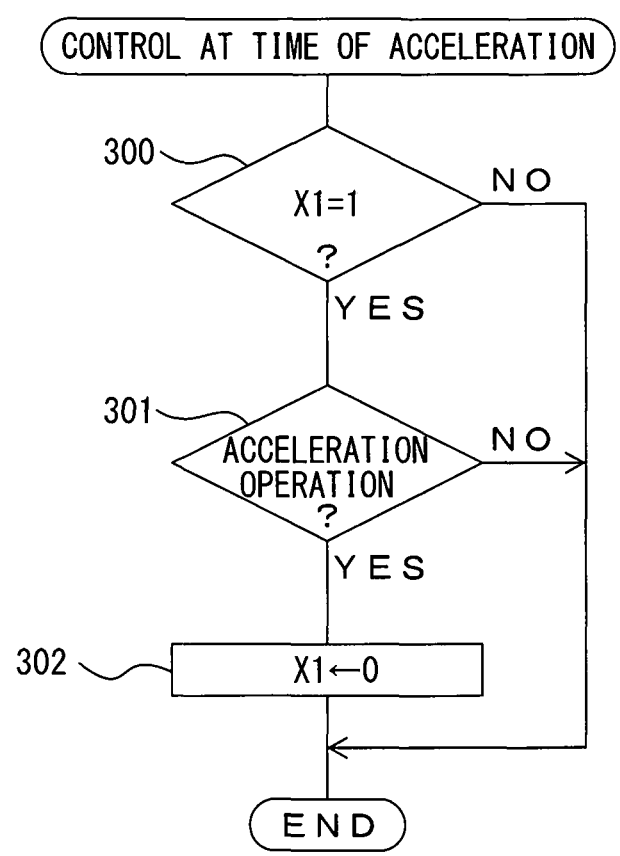
FIG. 20 is a flow chart which shows a routine for control at the time of acceleration of a fifth embodiment according to the present invention.

FIG. 20 shows a routine for control at the time of acceleration in the fifth embodiment which is shown in FIG. 19. This routine is performed by interruption every predetermined set time period.

Referring to FIG. 20, at step 300, it is judged if a first flag X1 is set. When the first flag X1 is reset (X1=0), the processing cycle ends. When the first flag X1 is set (X1=1), the routine proceeds from step 300 to step 301 where it is judged if an acceleration operation has been performed. When an acceleration operation is not being performed, the processing cycle ends. When an acceleration operation is being performed, the routine proceeds from step 301 to step 302 where the first flag X1 is reset (X1=0). Therefore, control for increasing gas is not performed.

In the embodiments according to the present invention explained up to here, the macropore zones ZMA are not provided with coated layers. In another embodiment, the macropore zones ZMA are provided with different coated layers which are different from the coated layers 75. In this case, the average pore size of the partition walls 72 at the macropore zones is set to 25 µm to 100 µm in the state where the different coated layers are provided. The different coated layers are, for example, formed from catalyst coated layers which carry a metal which has an oxidation function. As a result, it is easy to remove by oxidation the particulate matter which reaches the macropore zones ZMA.

REFERENCE SIGNS LIST 1 engine body
12 exhaust pipe
13 particulate filter
71i exhaust gas inflow passages
71o exhaust gas outflow passages
72 partition wall
ZMA macropore zone
ZMI micropore zone

The invention claimed is:

1. An exhaust purification device for an internal combustion engine, comprising:
    a particulate filter for trapping particulate matter which is contained in exhaust gas in an engine exhaust passage, wherein the particulate filter is provided with alternately arranged exhaust gas inflow passages and exhaust gas outflow passages and porous partition walls which separate the exhaust gas inflow passages and the exhaust gas outflow passages from each other, micropore zones are defined at upstream sides of the partition walls, macropore zones are defined at downstream sides of the partition walls, a pore size of the partition walls in the micropore zones is set so that particulate matter and ash can be trapped by the partition walls at the micropore zones, and a pore size of the partition walls in the macropore zones is set so that ash can pass through the partition walls at the macropore zones; and
    an electronic control unit configured to, when a quantity of trapped particulate matter on the particulate filter is smaller than a predetermined limit quantity, perform control for increasing gas which temporarily increases the flow rate of gas which flows into the particulate filter in order to remove the ash from the particulate filter.

2. The exhaust purification device for an internal combustion engine according to claim 1, wherein when the quantity of trapped particulate matter is smaller than the limit quantity, the electronic control unit is configured to not perform the control for increasing gas if an execution condition for control for increasing gas based on the engine operating conditions does not stand, and to perform the control when the execution condition stands.

3. The exhaust purification device for an internal combustion engine according to claim 2, wherein when a quantity of trapped ash on the particulate filter is greater than a predetermined set amount, the control for increasing gas is performed the next time the engine stops or the next time the engine restarts.

4. The exhaust purification device for an internal combustion engine according to claim 3, wherein when the control for increasing gas should be performed at the time the engine operation is stopped or the time the engine is restarted, the quantity of trapped particulate matter on the particulate filter is decreased before performing the control for increasing gas.

5. The exhaust purification device for an internal combustion engine according to claim 1, wherein the control for increasing gas is performed by temporarily increasing the flow rate of the exhaust gas which flows into the particulate filter.

6. The exhaust purification device for an internal combustion engine according to claim 1, further comprising an air pump which can feed secondary air in the exhaust passage upstream of the particulate filter, wherein control for increasing gas is performed by the air pump feeding secondary air to the particulate filter.

7. The exhaust purification device for an internal combustion engine according to claim 1, wherein the partition walls at the macropore zones have an average pore size which is set to 25 μm to 100 μm.

8. The exhaust purification device for an internal combustion engine according to claim 1, wherein the partition walls are provided with common substrates for the micropore zones and macropore zones, the pore size of the substrates is set so that the ash can pass through the substrates, surfaces of the substrates are covered by coated layers at the micropore zones, the surfaces of the substrates are not covered by coated layers at the macropore zones, and the pore size of the coated layers is set so as to enable the particulate matter to be trapped.

* * * * *